United States Patent [19]
Yamakawa et al.

[11] Patent Number: 5,963,535
[45] Date of Patent: *Oct. 5, 1999

[54] DISK REPRODUCING APPARATUS

[75] Inventors: Akio Yamakawa, Kanagawa; Takehiko Saito, Chiba; Yoshinori Matsumoto, Kanagawa, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/572,675

[22] Filed: Dec. 14, 1995

[30] Foreign Application Priority Data

Dec. 15, 1994 [JP] Japan .................................. 6-332816

[51] Int. Cl.⁶ .............................. G11B 21/02; G11B 7/00
[52] U.S. Cl. ........................................ 369/219; 369/244
[58] Field of Search ................................... 369/215, 219, 369/220, 244, 249, 44.14, 44.15, 44.16, 44.21, 44.22; 359/814, 823, 824

[56] References Cited

U.S. PATENT DOCUMENTS

| | | | |
|---|---|---|---|
| 4,442,516 | 4/1984 | Funabashi | 369/219 |
| 5,124,974 | 6/1992 | Kato et al. | 369/215 |
| 5,307,339 | 4/1994 | Tanaka | 369/215 |

FOREIGN PATENT DOCUMENTS

| | | | |
|---|---|---|---|
| 58-158078 | 9/1983 | Japan | 369/219 |
| 59-201201 | 11/1984 | Japan | 369/215 |
| 1-243273 | 9/1989 | Japan | 369/215 |
| 1-282739 | 11/1989 | Japan | 369/215 |
| 2-68724 | 3/1990 | Japan | 369/244 |
| 2-123529 | 5/1990 | Japan | 369/244 |
| 3-150729 | 6/1991 | Japan | 369/244 |
| 5-234115 | 9/1993 | Japan | 369/244 |
| 5-342597 | 12/1993 | Japan | 369/244 |

*Primary Examiner*—David L. Ometz
*Attorney, Agent, or Firm*—Frommer Lawrence & Haug, LLP.; William S. Frommer

[57] ABSTRACT

A disk reproducing apparatus capable of improving the feeding accuracy of a pickup, reducing the cost of a feeding portion of the pickup, and realizing a small-sized skew adjustment mechanism at low cost, wherein the disk producing apparatus comprises: a disk driving unit for rotating a disk; a pickup having a first guide portion provided on one side portion and a guide face provided on the other side portion; a base member having a guide member for receiving the guide face, the guide member having a length shorter than the sliding distance of the pickup in the guiding direction; a driving unit for driving the pickup in the radial direction of the disk; and a signal processing unit for applying a specified processing to a signal reproduced from the pickup. Preferably, the first guide portion comprises: a guide shaft supported on the base; and a guide bearing provided on the one side portion of the pickup in such a manner as to be slidably inserted around the guide shaft.

8 Claims, 12 Drawing Sheets

DISK REPRODUCING APPARATUS

BACKGROUND OF THE INVENTION

1. Field of the Invention

The present invention relates to a new disk reproducing apparatus, and particularly to a new disk reproducing apparatus capable of improving the feeding accuracy of a pickup, reducing the cost of a feeding portion of the pickup, and realizing a small-sized skew adjustment mechanism at low cost.

2. Description of the Related Art

Figure 15:
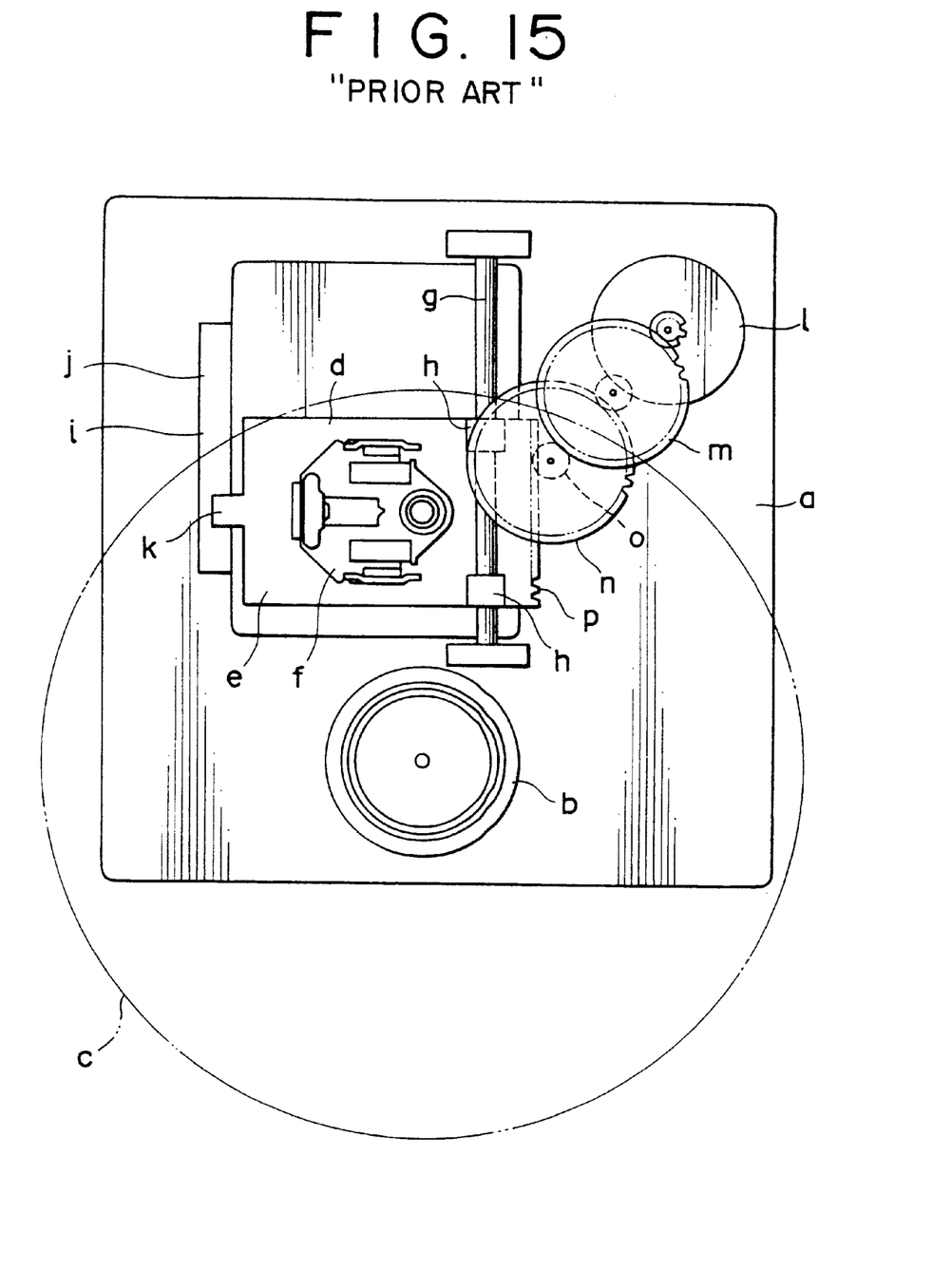
FIG. 15 is a schematic plan view showing one example of a related art disk reproducing apparatus.

A pickup feeding mechanism of a related art disk reproducing apparatus has a configuration, for example, shown in FIG. 15.

Referring to FIG. 15, a turn-table "b" rotatable by a spindle motor (not shown) is disposed on a base "a". An optical disk "c" is chucked on the turn-table "b" so as to be rotatable together with the turn-table "b".

Reference character "d" indicates an optical pickup which includes a movable base "e" and a pickup main body "f" supported on the movable base "e".

A guide shaft "g" is disposed on the base "a", and guide bearings "h" provided on the movable base "e" of the optical pickup "d" are slidably inserted around the guide shaft "g". With this configuration, the optical pickup "d" is movable along the guide shaft "g".

A guide member "i" is provided on the base "a", and the upper surface thereof constitutes a guide face "j" extending in parallel to the guide shaft "g".

Reference character "k" indicates a projection to be guided, which projects from the movable base "e" of the optical pickup "d". The projection "k" to be guided is slid on the guide face "j" of the guide member "i".

A movable motor "l" is supported on the base "a". The rotation of the movable motor "l" is transmitted to a movable gear "n" through an intermediate gear "m". A small gear "o" of the movable gear "n" meshes with a rack "p" formed on the movable base "e" of the optical pickup "d". The optical pickup "d" is thus moved by driving of the movable motor "l".

More specifically, since the guide bearings "h" of the movable base "e" are moved along the guide shaft "g", and the projection "k" to be guided is slid on the guide face "j", the optical pickup "d" is moved by way of a specified path.

In the above-described optical disk recording/reproducing apparatus, the feeding accuracy of the optical pickup "d" is determined by the accuracy of the guide face "j" of the guide member "i" provided on the base "a". In other words, the accuracy of the base "a" exerts an effect on the feeding accuracy of the optical pickup "d". Consequently, if the optical pickup "d" requires a high feeding accuracy, accuracies of the base "a" and the associated parts must be enhanced, resulting in the increased cost.

In the case of provision of mechanisms such as a skew adjustment mechanism and a skew servo mechanism, the base "a" must be moved as a whole. This causes a problem in enlarging the size of the apparatus and in increasing the number of parts.

SUMMARY OF THE INVENTION

An object of the present invention is to provide a disk reproducing apparatus capable of improving the feeding accuracy of a pickup, reducing the cost of a feeding portion of the pickup, and realizing a small-sized skew adjustment mechanism at low cost.

To achieve the above object, according to a preferred mode of the present invention, there is provided a disk reproducing apparatus comprising: a disk driving unit for rotating a disk; a pickup having a first guide portion provided on one side portion and a guide face provided on the other side portion; a base member having a guide member for receiving the guide face, the guide member having a length shorter than the sliding distance of the pickup in the guiding direction; a driving unit for driving the pickup in the radial direction of the disk; and a signal processing unit for applying a specified processing to a signal reproduced from the pickup. In this disk reproducing apparatus, the first guide portion preferably comprises: a guide shaft supported on the base; and a guide bearing provided on the one side portion of the pickup in such a manner as to be slidably inserted around the guide shaft.

With this configuration, the feeding accuracy of the pickup is substantially determined only by accuracies of the pickup and the guide member, so that the management in accuracy can be easily made and further the pickup can be fed at a high accuracy without increasing the accuracy of the base so much. Thus, it becomes possible to reduce the cost of the base and the associated parts.

In the above disk reproducing apparatus, the guide shaft preferably has a first supporting member for tiltingly supporting at least one end of the guide shaft.

With this configuration, the tilting of the pickup in the radial direction of the recording medium, that is, the disk can be adjusted by tilting the guide shaft, and accordingly, the adjustment of the radial skew can be easily performed.

The above disk reproducing apparatus may further comprise a second supporting member for vertically movably supporting the guide member.

With this configuration, the tilting of the pickup in the direction perpendicular to the radial direction of the recording medium, that is, the disk can be adjusted by vertically moving the guide member, and accordingly the adjustment of the tangential skew can be easily performed.

The above disk reproducing apparatus may further comprise a third supporting member for supporting the guide shaft in such a manner that the orientation of the guide shaft is variable along the surface of the base.

With this configuration, the pickup is turned within a plane by turning the guide shaft within the plane, and thereby the RD adjustment can be simply performed.

DETAILED DESCRIPTION OF THE PREFERRED EMBODIMENTS

Hereinafter, preferred embodiments of the present invention will be described in detail with reference to the accompanying drawings. In these embodiments, a disk reproducing apparatus of the present invention is applied to an optical disk recording/reproducing apparatus.

FIGS. 1 to 6B show a first embodiment of the optical disk recording/reproducing apparatus according to the present invention.

Figure 1:
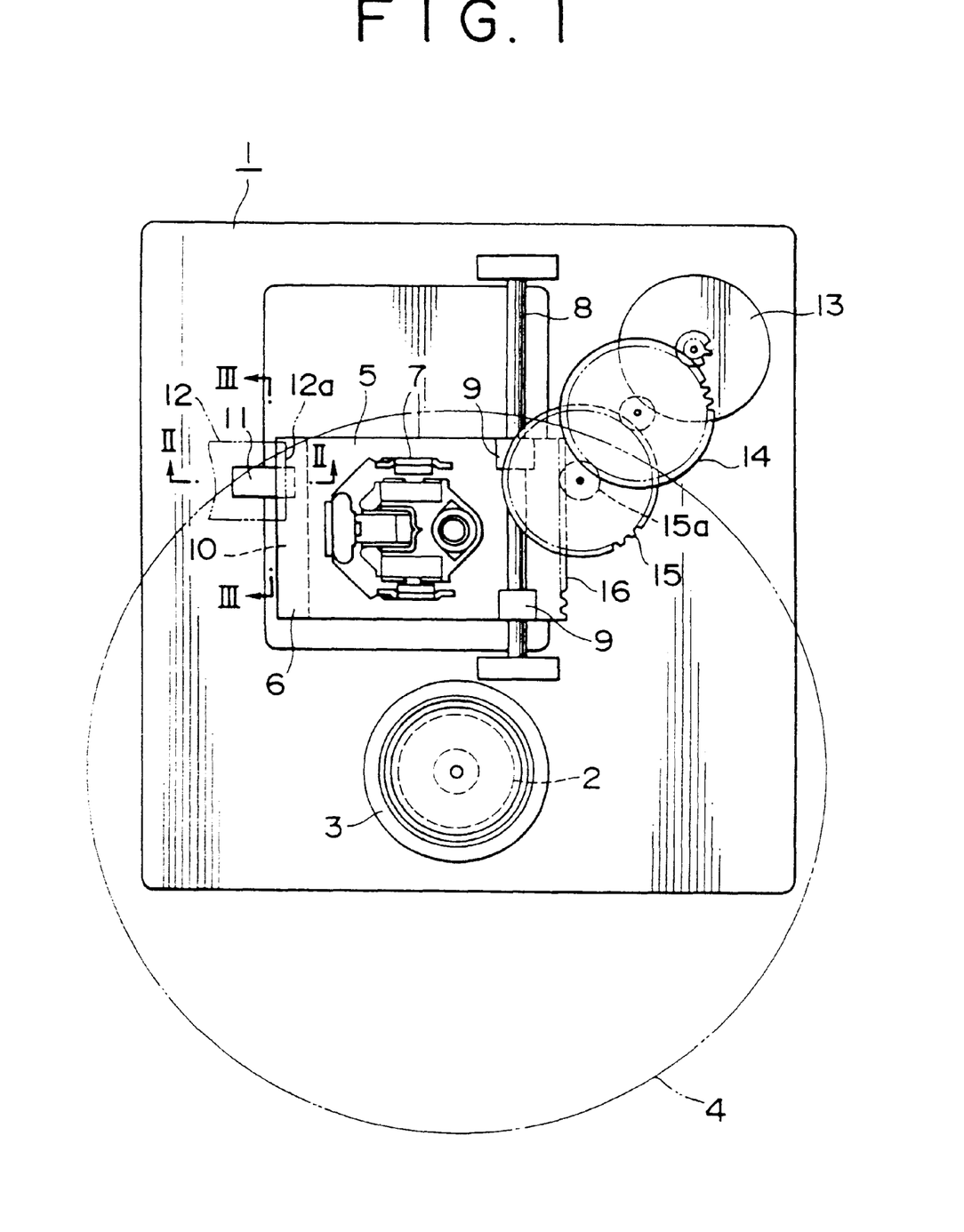
FIG. 1 is a schematic plan view showing a first embodiment of a disk reproducing apparatus of the present invention.
Figure 2:
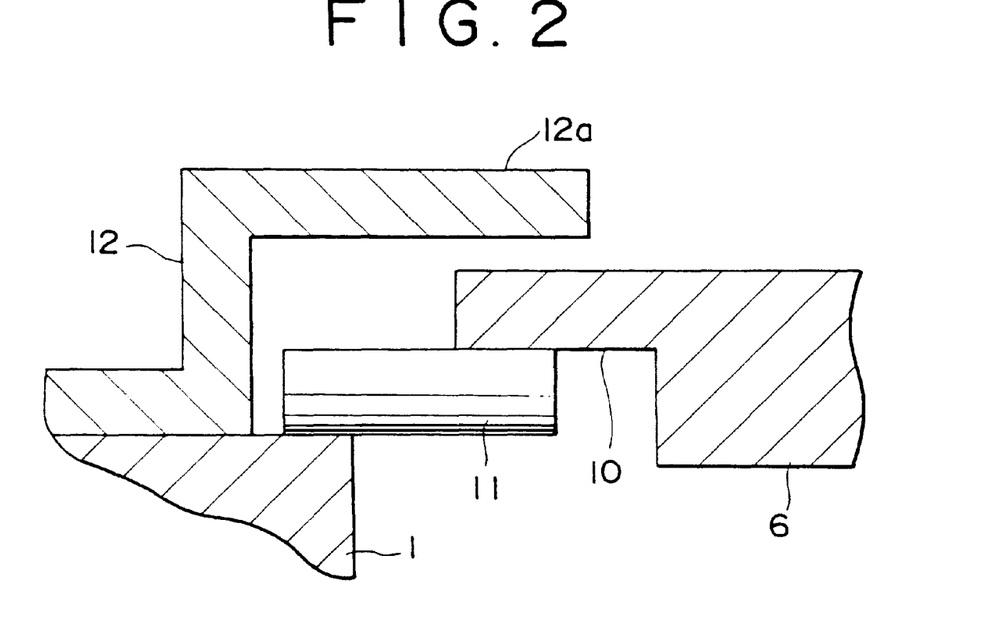
FIG. 2 is an enlarged sectional view taken on line II—II of FIG. 1.
Figure 3:
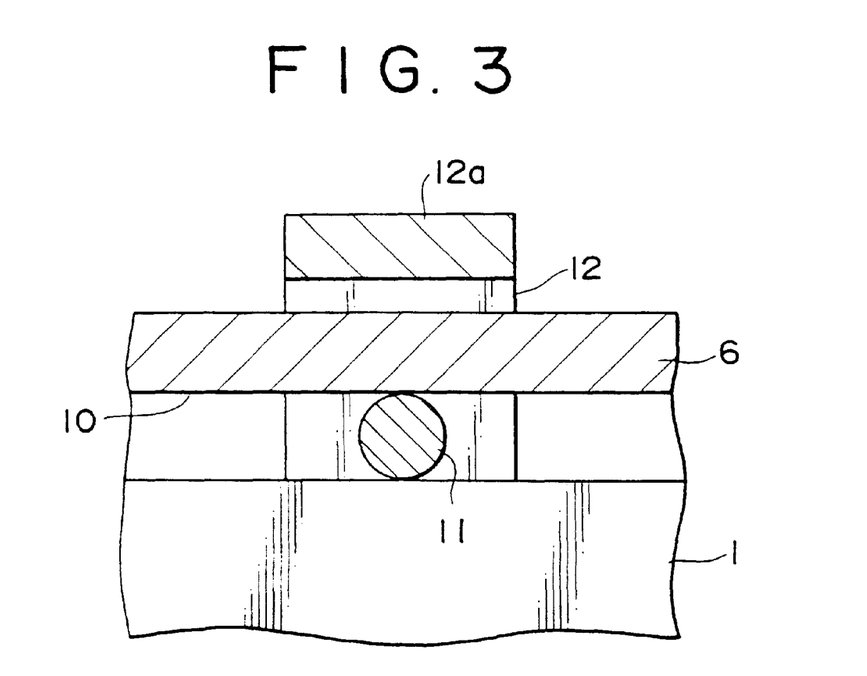
FIG. 3 is a sectional view taken on line III—III of FIG. 1.

In these figures, reference numeral 1 indicates a base, and reference numeral 2 indicates a spindle motor fixed on the base 1. A turn-table 3 is fixed on a rotating shaft of the spindle motor 2, and an optical disk 4 is chucked on the turn-table 3 to be rotatable together with the turn-table 3.

Reference numeral 5 indicates an optical pickup, which includes a movable base 6 and a pickup main body 7 supported on the movable base 6.

A guide shaft 8 is disposed on the base 1 in such a manner as to extend in parallel to the radial direction of the optical disk 4 chucked on the turn-table 3.

Guide bearings 9, 9 are formed on both end portions of one edge portion of the movable base 6 of the optical pickup 5. These bearings 9, 9 are slidably inserted around the guide shaft 8. A guide face 10 is formed on the lower surface of the other edge portion of the movable base 6 in such a manner as to extend in the direction along which the guide bearings 9, 9 are separated from each other.

A guide member 11 is provided on the base 1 at a position where it faces to the guide shaft 8 while putting the optical pickup 5 therebetween. The guide member 11 is formed into a round-bar shape, and the guide face 10 of the optical pickup 5 is slidably placed on the guide member 11.

With this configuration, the optical pickup 5 is movable in the radial direction of the optical disk 4 chucked by the turn-table 3 in the state that the movable base 6 is guided by the guide shaft 8 and the guide member 11.

Reference numeral 12 indicates a stopper having a control end 12a positioned over the guide member 11. The control end 12a is separated slightly upward from the portion, where the guide face 10 is formed, of the movable base 6 of the optical pickup 5 for preventing such a portion of the movable base 6 from being largely floated upward from the guide member 11.

A movable motor 13 is supported on the base 1. The rotation of the movable motor 13 is transmitted to a movable gear 15 through an intermediate gear 14. A small gear 15a of the movable gear 15 meshes with a rack 16 formed on one edge of the movable base 6 of the optical pickup 5. The optical pickup 5 is thus moved by driving of the movable motor 13.

In the above-described optical disk recording/reproducing apparatus, the guide face 10 is provided on the movable base 6 of the optical pickup 5 on the side opposite to the portion guided by the guide shaft 8. The guide face 10, which extends longer in the movement direction of the movable base 6, is guided while being slidably contacted with the round-bar shaped guide member 11 provided on the base 1. Accordingly, with respect to the base 1 side, only the positional accuracy of the portion slidably contacted with the guide face 10 of the guide member 11 exerts an effect on the feeding accuracy of the optical pickup 5, and the rest of the feeding accuracy of the optical pickup 5 is dependent on the accuracy of the optical pickup 5 side. As a result, it becomes possible to lower the accuracies of parts of the base 1 and hence to reduce the cost of the parts of the base 1.

Figure 4A:
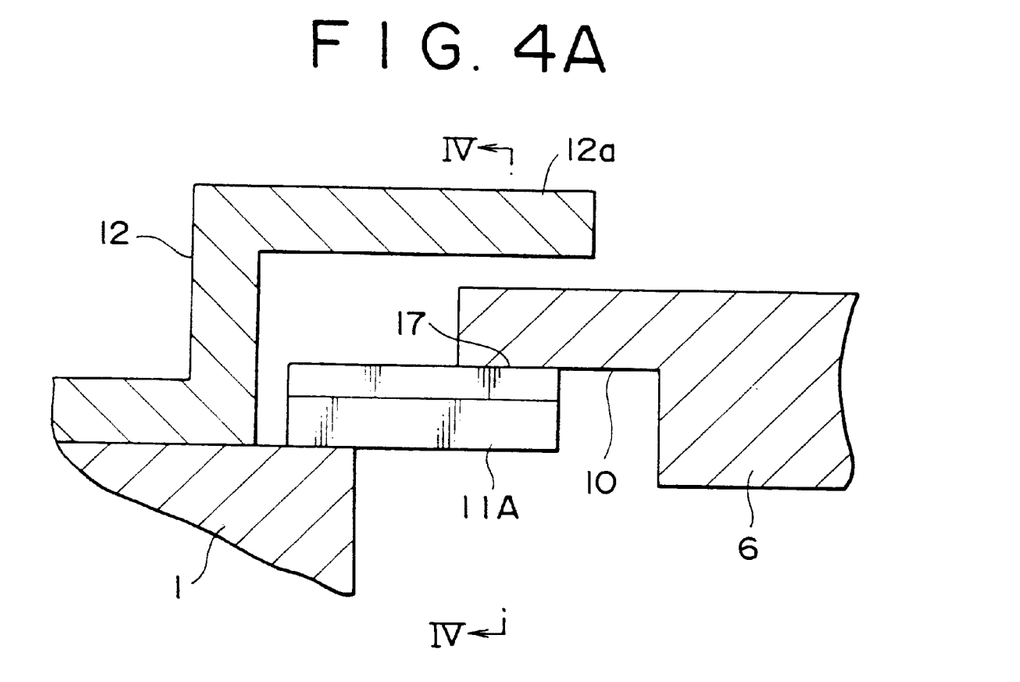
FIG. 4A is an enlarged sectional view showing essential portions of a modification of a guide member in the first embodiment.
Figure 4B:
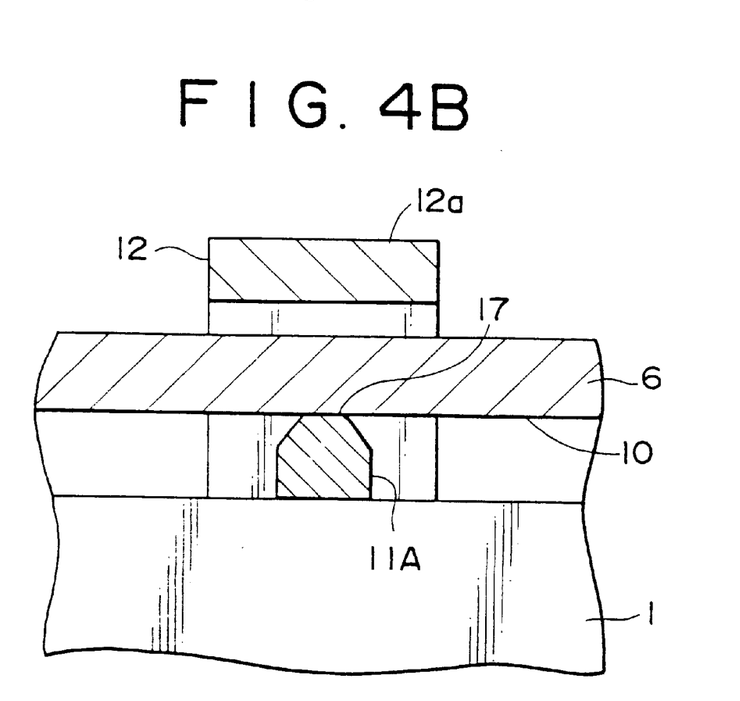
FIG. 4B is a sectional view taken on line IV—IV of FIG. 4A.

FIGS. 4A and 4B show a modification 11A of the guide member.

The guide member 11A has an upper end portion formed into a trapezoidal shape in transverse cross-section. A slidably contact face 17 to be slidably contacted with the guide face 10 of the optical pickup 5 is formed such that the length thereof in the movement direction of the optical pickup 5 is shortened. The guide face 10 of the optical pickup 5 is guided by the slidably contact face 17 while being slidably contacted therewith.

Figure 5A:
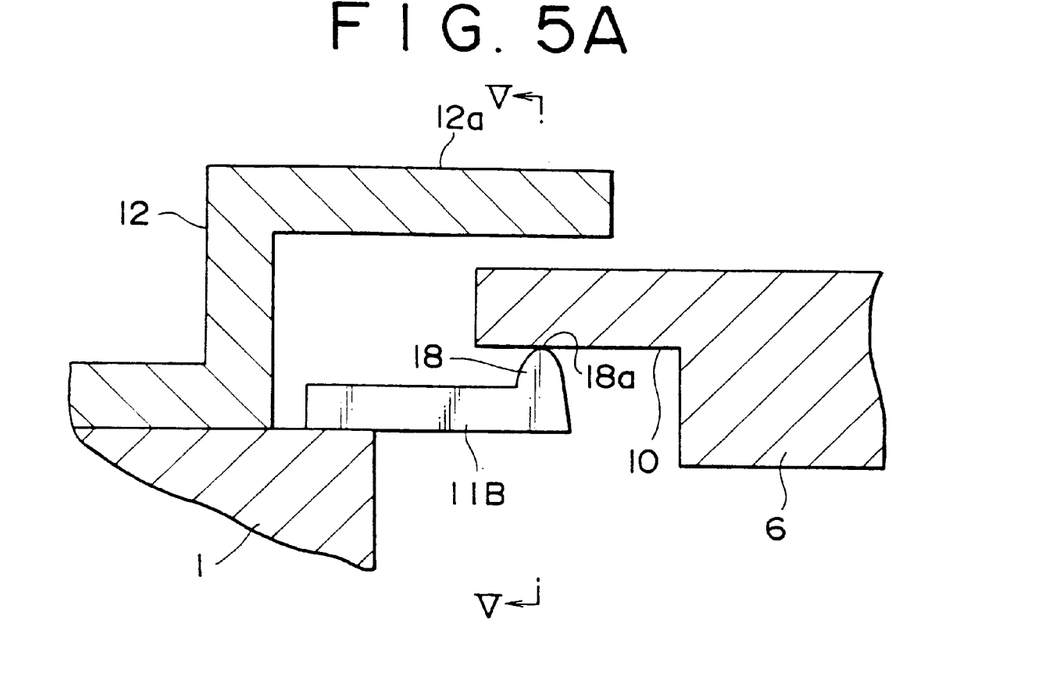
FIG. 5A is an enlarged sectional view showing essential portions of another modification of the guide member in the first embodiment.
Figure 5B:
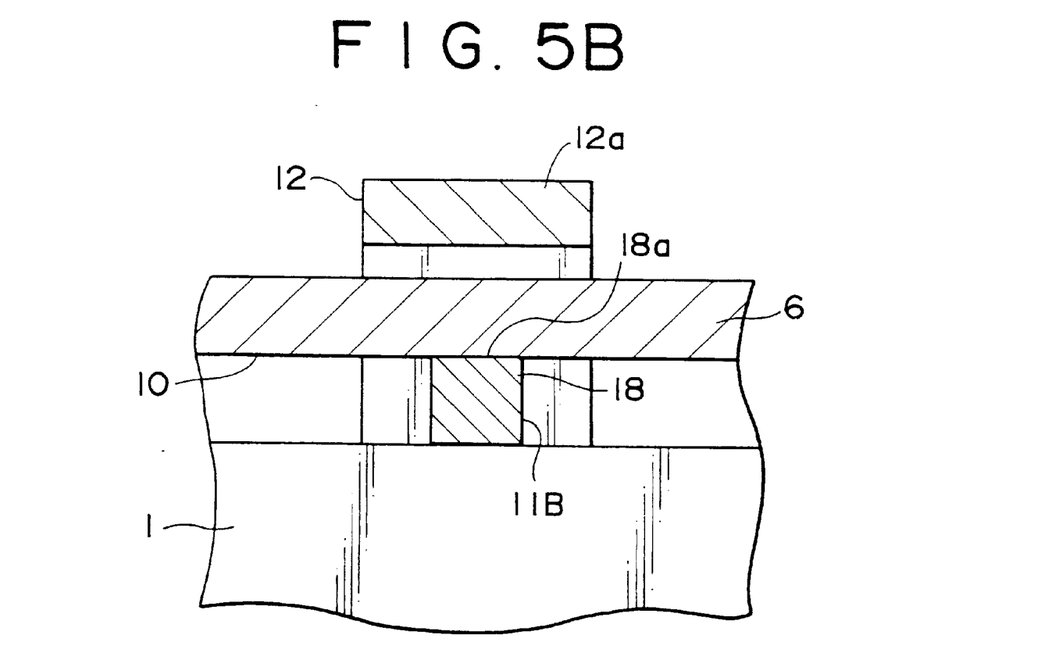
FIG. 5B is a sectional view taken on line V—V of FIG. 5A.

FIGS. 5A and 5B show another modification 11B of the guide member.

A guide projection 18 is formed on the upper surface of the leading end of the guide member 11B. The guide projection 18 extends shorter in the movement direction of the optical pickup 5. An upper surface 18a of the guide projection 18 is formed into an arcuate shape in transverse cross-section, and it functions as a slidably contact face. The guide face 10 of the optical pickup 5 is guided by the slidably contact face 18a while being slidably contacted therewith.

Figure 6A:
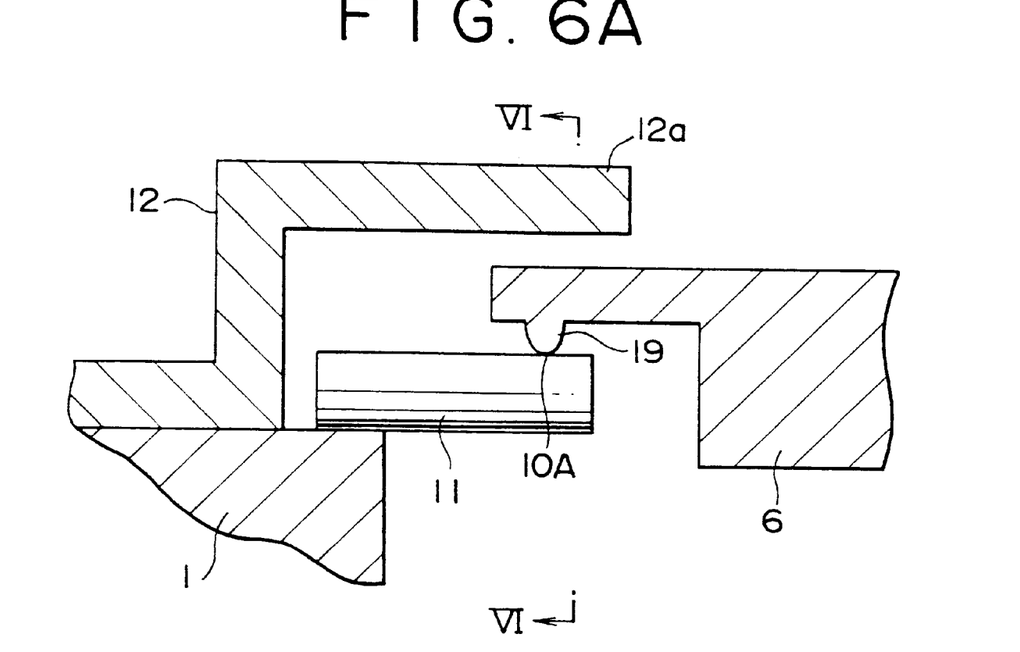
FIG. 6A is an enlarged sectional view showing essential portions of a modification of a guide face in the first embodiment.
Figure 6B:
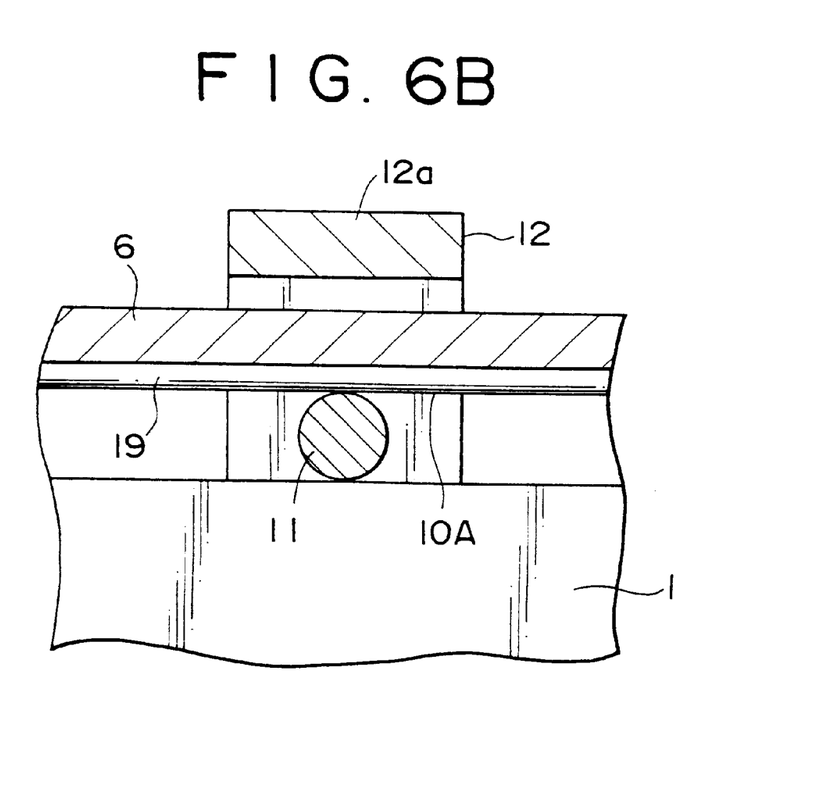
FIG. 6B is a sectional view taken on line VI—VI of FIG. 6A.
Figure 7:
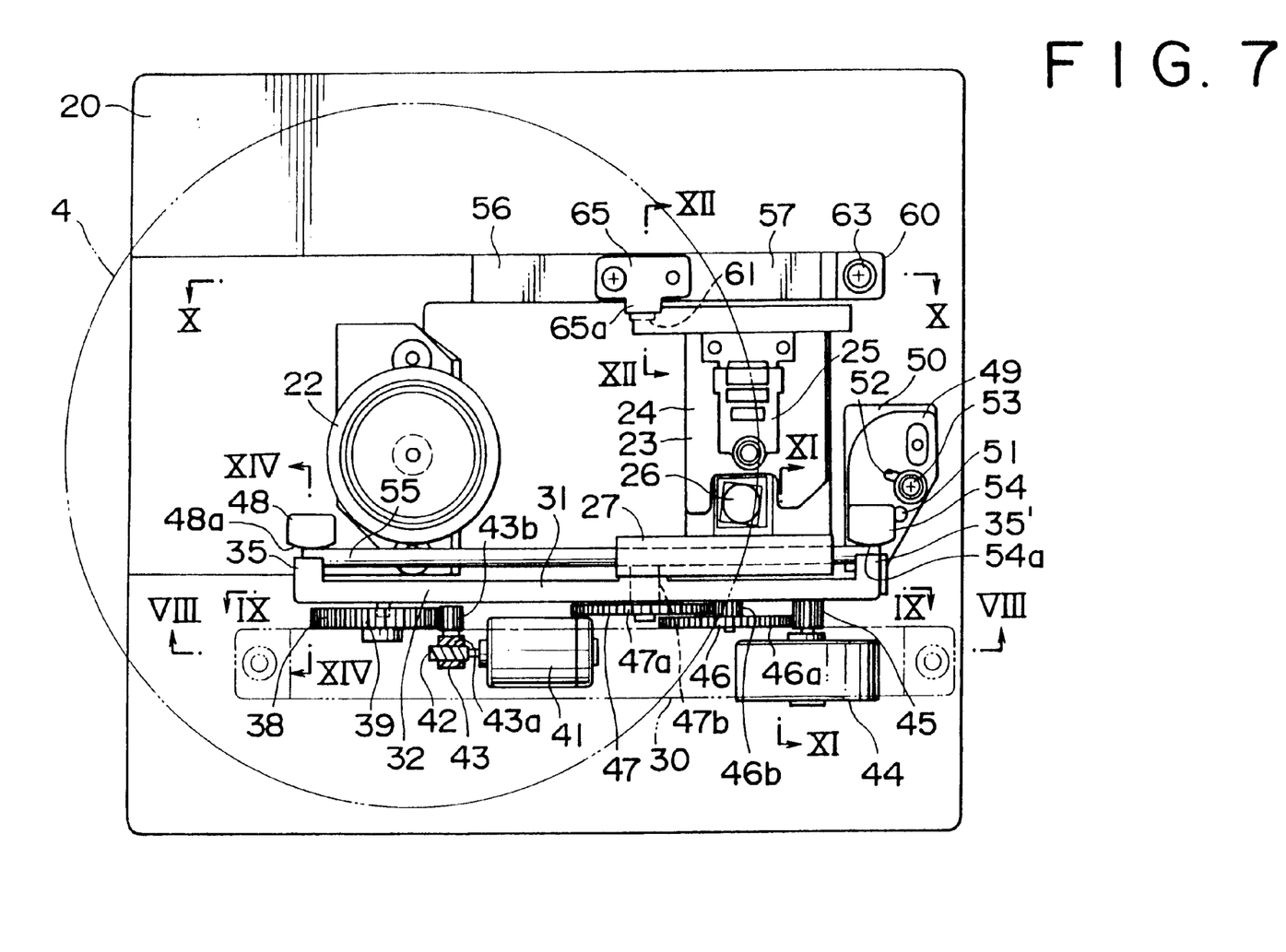
FIG. 7 is a schematic plan view of a second embodiment of the disk reproducing apparatus of the present invention.
Figure 8:
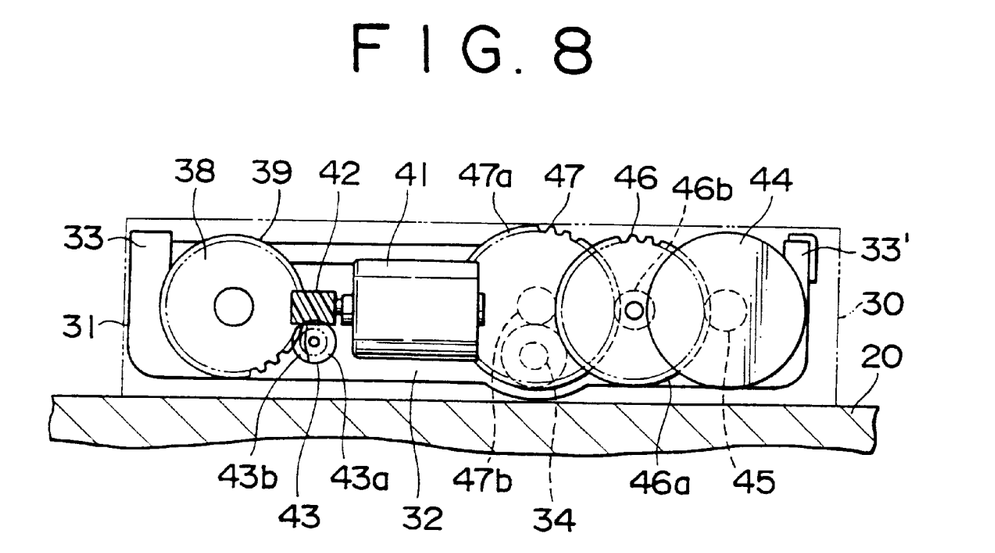
FIG. 8 is a sectional view taken on line VIII—VIII of FIG. 7.
Figure 9:
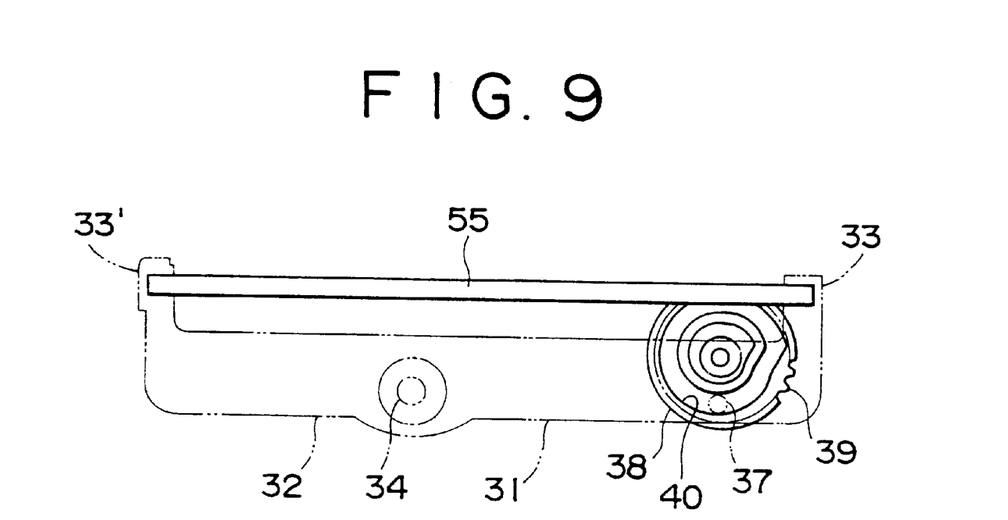
FIG. 9 is a sectional view taken on line IX—IX of FIG. 7.
Figure 10:
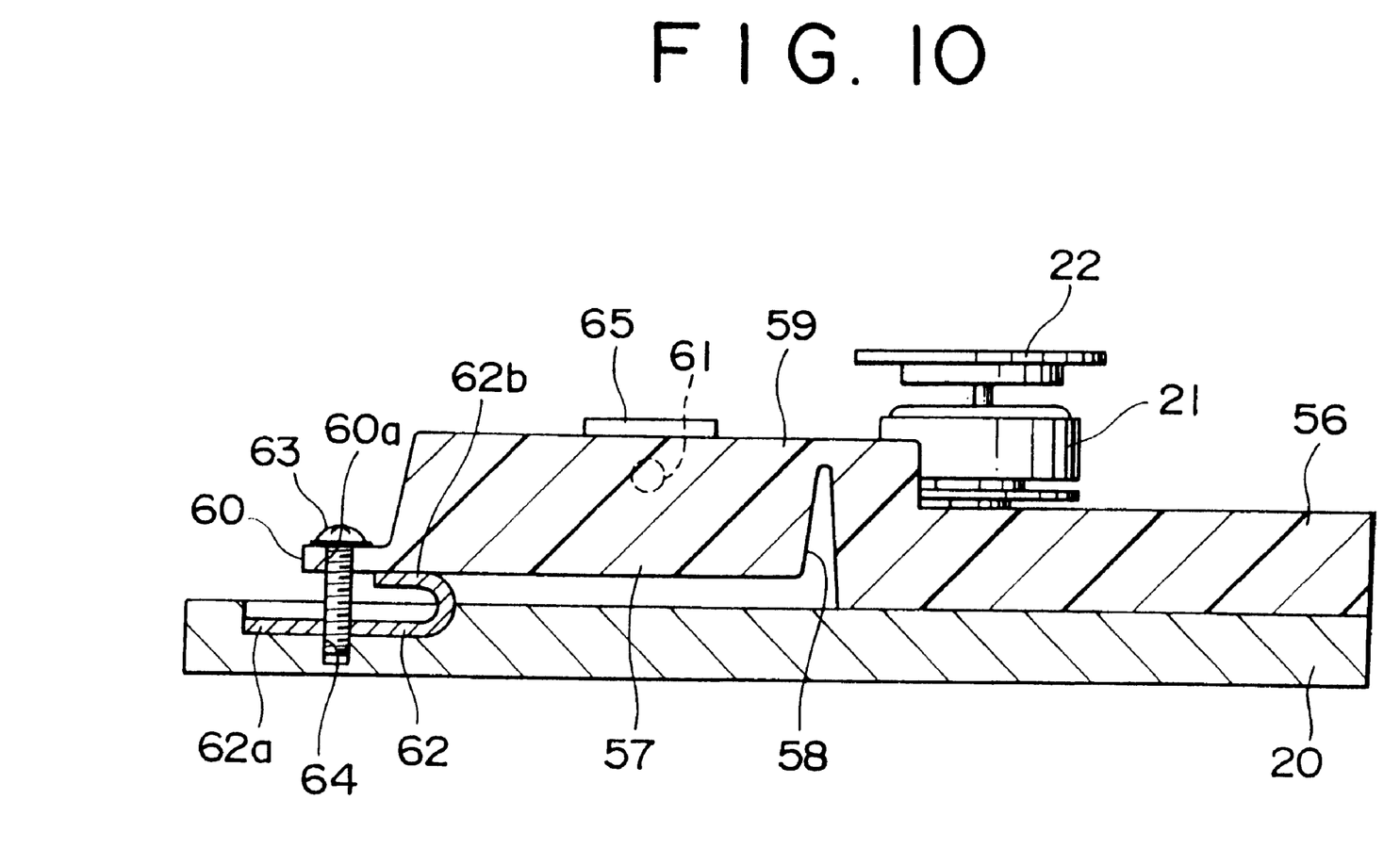
FIG. 10 is a sectional view taken on line X—X of FIG. 7.
Figure 11:
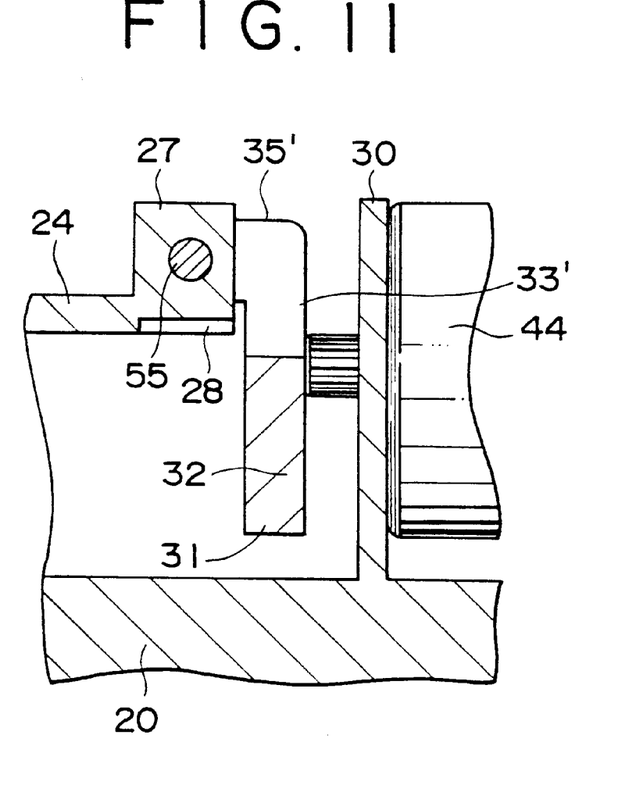
FIG. 11 is a sectional view taken on line XI—XI of FIG. 7.
Figure 12:
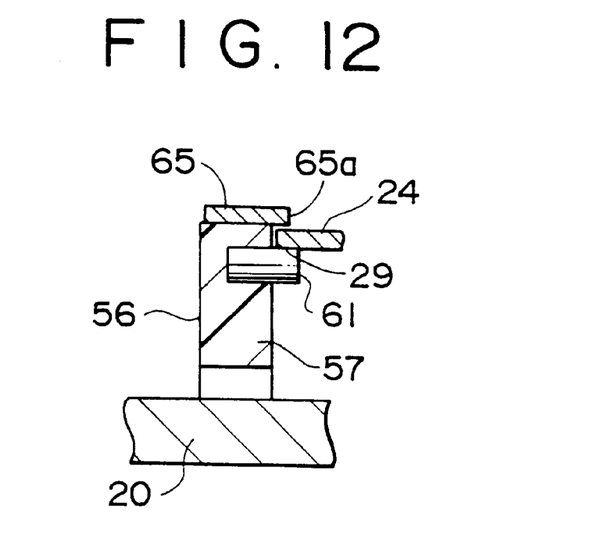
FIG. 12 is a sectional view taken on line XII—XII of FIG. 7.

FIGS. 6A and 6B show a modification 10A of the guide face.

A projection 19 is formed on the lower surface of the other end portion of the movable base 6 of the optical pickup 5. The projection 19 extends longer in the movement direction of the movable base 6. The lower end portion of the projection 19 is formed into an arcuate shape in transverse cross-section, and such a lower end surface 10A functions as a guide face.

FIGS. 7 to 14 show a second embodiment in which the disk reproducing apparatus of the present invention is applied to an optical disk recording/reproducing apparatus.

In these figures, reference numeral 20 indicates a base, and reference numeral 21 indicates a spindle motor fixed on the base 20. A turn-table 22 is fixed on a rotating shaft of the spindle motor 21. An optical disk 4 is chucked on the turn-table 22 so as to be rotated together with the turn-table 22.

Reference numeral 23 indicates an optical pickup, which includes a movable base 24 and a pickup main body 25 supported on the movable base 24. A skew sensor 26 is mounted on the movable base 24 for detecting a deviation in optical axis between a light beam emitted to the optical disk 4 and a reflection light beam from the optical disk 4.

A guide bearing 27 is formed on one edge portion of the movable base 24, and a rack 28 is formed on the lower surface of the one edge portion of the movable base 24. A guide face 29 is formed on the lower surface of the other edge portion of the movable base 24. The guide bearing 27, rack 28 and guide face 29 are formed to extend in parallel to each other along the same direction.

A sub-base 30 is fixed on the upper surface of the base 20, which forms a wall extending longer in the feeding direction of the optical pickup 23.

Reference numeral 31 indicates a guide shaft supporting member, which has a main portion 32 forming a wall extending longer in the feeding direction of the optical pickup 23 and supporting arms 33, 33' projecting upward from both ends of the main portion 32. An approximately central portion of the main portion 32 is turnably supported on the sub-base 30 by means of a rotating shaft 34.

Supporting portions 35, 35' are respectively formed on the upper ends of the supporting arms 33, 33' in such a manner as to project opposite to the sub-base 30 side. Receiving recesses 36, 36' are respectively formed in the supporting portions 35, 35' in such a manner as to be opened opposite to the sub-base 30 side. It is to be noted that each of the receiving recesses 36, 36' is formed into a semi-circular shape as seen in the movement direction of the optical pickup 23.

A cam pin 37 is projectingly provided at a position near the one end on the surface, facing to the sub-base 30 side, of the main portion 32.

A cam gear 38 is rotatably supported at one end portion on the surface, facing to the guide shaft supporting member 31 side, of the sub-base 30. With respect to the cam gear 38, a gear portion 39 is formed on the outer peripheral surface thereof and a cam groove 40 is formed in the surface thereof facing to the guide shaft supporting member 31 side. A leading end of the cam pin 37 formed on the guide shaft supporting member 31 is slidably engaged in the cam groove 40.

Reference numeral 41 indicates a skew motor fixed on the sub-base 30; reference numeral 42 indicates a worm fixed on a rotating shaft of the skew motor 41; and reference numeral 43 indicates an intermediate gear rotatably supported on the sub-base 30. The intermediate gear 43 includes a worm wheel 43a meshing with the worm 42, and a pinion 43b integrally projecting from the surface, facing to the guide shaft supporting member 31 side, of the worm wheel 43a. The pinion 43b meshes with the gear portion 39 of the cam gear 38.

When the skew motor 41 is driven, the cam gear 38 is rotated, so that the position of the cam groove 40 engaged with the cam pin 37 provided on the guide shaft supporting member 31 is changed. As a result, the height of the portion, where the cam pin 37 is formed, of the guide shaft supporting member 31 is changed. The guide shaft supporting member 31 is thus turned around the rotating shaft 34.

A feed motor 44 is fixed on the sub-base 30. A pinion 45 is fixed on an output shaft of the feed motor 44.

An intermediate gear 46 is rotatably supported on the sub-base 30, which includes a large gear 46a and a small gear 46b. The large gear 46a meshes with the pinion 45.

A feed gear 47 is rotatably supported on the sub-base 30 at a position over the rotating shaft 34, which includes a large gear 47a and a pinion 47b. The large gear 47a meshes with the small gear 46b of the intermediate gear 46.

Accordingly, when the feed motor 44 is driven, the feed gear 47 is rotated through the intermediate gear 46.

A radial dependence (RD) adjustment fulcrum member 48 is fixed on the base 20 in such a manner as to face to the opening side of the receiving recess 36 of one supporting arm 33 of the guide shaft supporting member 31. A face 48a, facing to the receiving recess 36, of the RD adjustment fulcrum member 48 is formed into an arcuate shape in a plan view. This face 48a functions as a fulcrum face.

Figure 13:
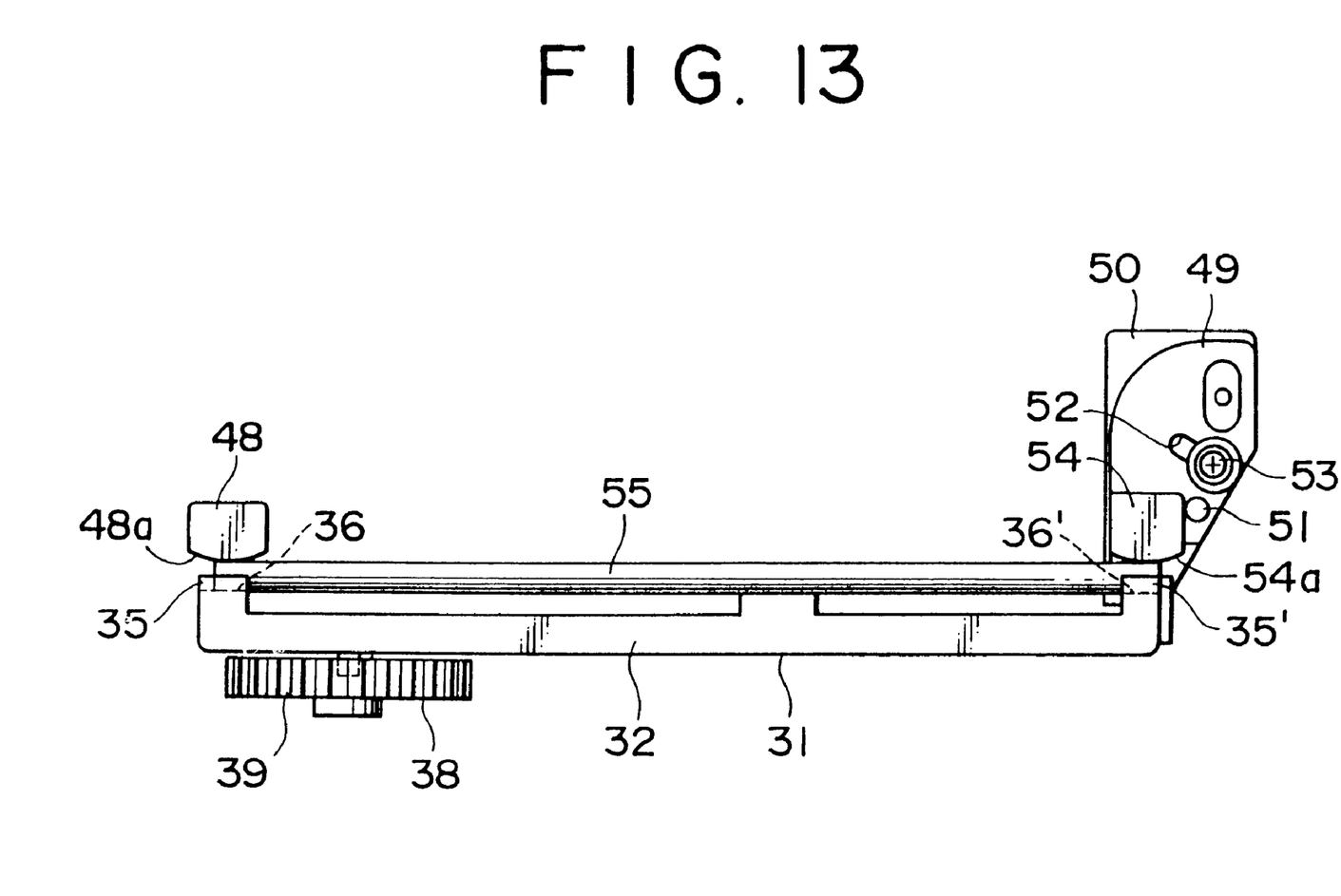
FIG. 13 is a plan view showing only essential portions of a RD adjustment mechanism in the second embodiment.
Figure 14:
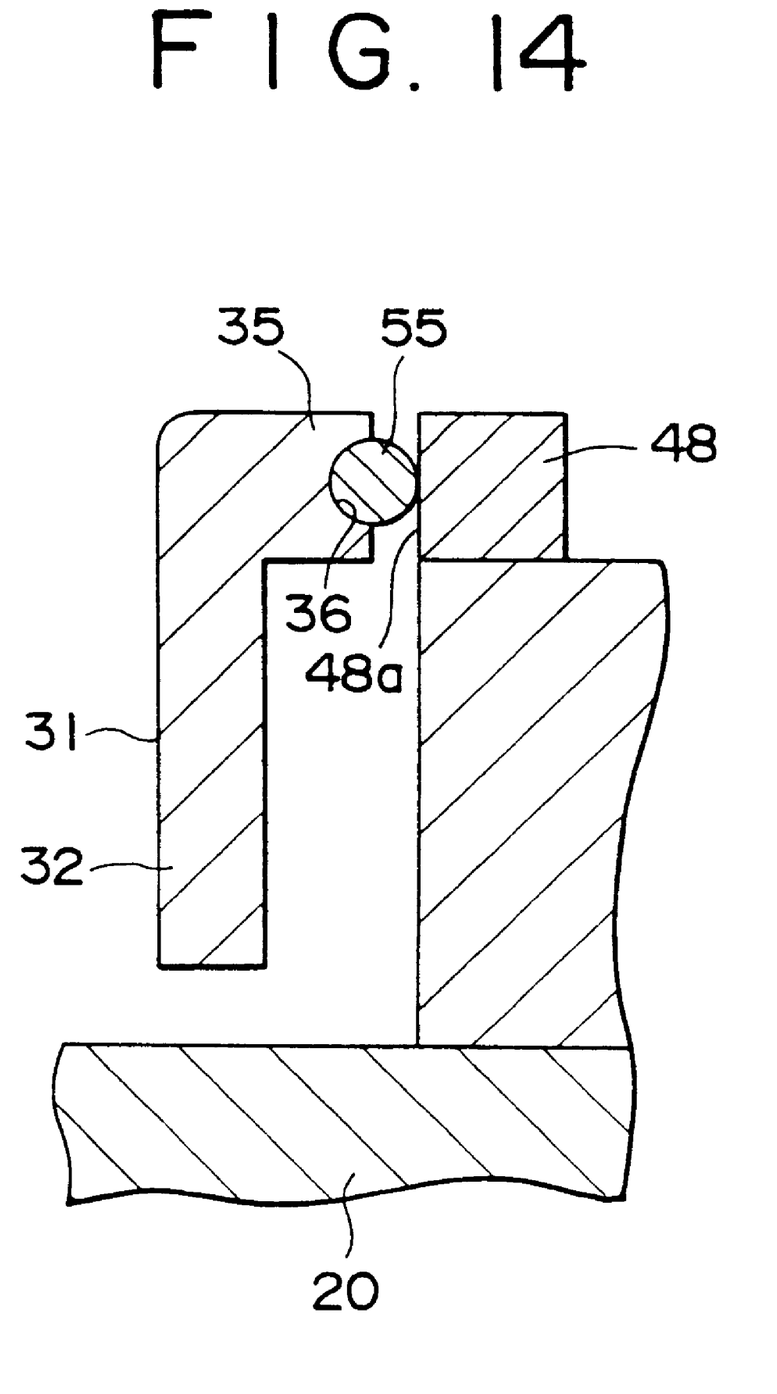
FIG. 14 is an enlarged sectional view taken on line XIV—XIV of FIG. 7.

A RD adjustment plate 49 is supported on a bed 50 provided on the base 20 in such a manner as to be turnable by a RD adjustment shaft 51. The RD adjustment plate 49 has a slot 52 formed into an arcuate shape centered on a portion supported by the adjustment shaft 51. A screw 53 is fastened in the bed 50 through the slot 52. The position of the RD adjustment plate 49 is thus fixed.

A receiving member 54 is fixed on the upper surface of the RD adjustment plate 49 in such a manner as to face to the receiving recess 36' of the other arm 33' of the guide shaft supporting member 31. A face 54a, facing to the receiving recess 36', of the receiving member 54 is formed into an arcuate shape in a plan view. This face 54a functions as a receiving face.

Reference numeral 55 indicates a round-bar shaped guide shaft. Both ends of the guide shaft 55 are partially received in the receiving recesses 36, 36' of the guide shaft supporting member 31, respectively; and they are biased to the fulcrum face 48a of the RD adjustment fulcrum member 48 and the receiving face 54a of the receiving member 54 of the RD adjustment plate 49 by means of a biasing means (not shown). In addition, the biasing means may be so constructed that the guide shaft supporting member 31 is supported by the rotating shaft 34 with a slight allowance in the axial direction, and one end portions of the U-shaped plate springs are fixed on both the end portions of the sub-base 30 while the other end portions thereof are elastically contacted with both the end portions of the guide shaft supporting member 31.

With this configuration, when the RD adjustment plate 49 is turned by loosening the screw 53 fixing the RD adjustment plate 49 on the bed 50, the position at which the receiving face 54a is contacted with the guide shaft 55 is changed in the direction where the sub-base 30 and the guide shaft supporting member 31 are arranged. As a result, the guide shaft 55 can be changed in its orientation so as to be turned around the contact point with the fulcrum face 48a.

The guide bearing 27 of the movable base 24 of the optical pickup 23 is slidably inserted around the guide shaft 55, and the rack 28 meshes with the pinion 47b of the feed gear 47.

A guide member supporting member 56 is fixed on the base 20 in such a manner as to face to and extend in parallel to the guide shaft supporting member 31. An approximately half portion 57 of the guide member supporting member 56 is taken as a guide member supporting portion which is floated from the upper surface of the base 20. A slit 58 is formed at a position between the guide member supporting portion 57 and the rest of the guide member supporting member 56. The slit 58 extends from the lower surface to a portion near the upper surface of the guide member supporting portion 57. The guide member supporting portion 57 is thus flexible at a thin-walled connection portion 59 positioned on the upper side of the slit 58.

A projection 60 is formed on the lower end portion of the end (hereinafter, referred to as "free end") surface, opposite to the slit 58 side, of the guide member supporting portion 57. The projection 60 projects opposite to the slit 58 side. A through-hole 60a is formed in the projection 60.

A round-bar shaped guide member 61 is supported on the surface, facing to the guide shaft supporting member 31, of the guide member supporting portion 57 at a position shifted upward from an approximately central portion in the length direction. The round-bar shaped guide member 61 projects to the guide shaft supporting member 31. The upper surface of the guide member 61, that is, the surface to be contacted with the guide face 29 of the optical pickup 23 is located over the rotating shaft 34 functioning as the supporting shaft of the guide shaft supporting member 31, and it is located at a position substantially corresponding to the portion where the guide shaft 55 is contacted with the guide bearing 27.

Reference numeral 62 indicates a supporting member formed of a plate spring. The leading end portion of the supporting member 62 is folded in a U-shape, to form a long mounting portion 62a and a short supporting piece 62b. The mounting portion 62a is fixed on the base 20. The lower surface, on the free end side, of the guide member supporting portion 57 of the guide member supporting member 56 is placed on the supporting piece 62b.

A skew adjustment screw 63 downward passes through the through-hole 60a of the projection 60 formed on the guide member supporting portion 57 of the guide member supporting member 56, and is fastened in a screw hole 64 formed in the base 20.

When the skew adjustment screw 63 is further fastened in the screw hole 64, the free end of the guide member supporting portion 57 is descended against the biasing force of the supporting member 62. Consequently, the guide member 61 supported on the guide member supporting portion 57 is also descended. On the other hand, when the skew adjustment screw 63 is loosened from the screw hole 64, the free end of the guide member supporting portion 57 is ascended by the biasing force of the supporting member 62. Consequently, the guide member 61 is also ascended.

The guide face 29 formed on the movable base 24 of the optical pickup 23 is placed on the guide member 61. When the rack 28 is fed by the pinion 47b of the feed gear 47 rotated by driving of the feed motor 44, the optical pickup 23 is moved in the radial direction of the optical disk 4 chucked on the turn-table 22 while being guided by the guide shaft 55 and the guide member 61.

A stopper 65 is fixed on the upper end surface of the guide member supporting portion 57 of the guide member supporting member 56. A control end 65a of the stopper 65 projects to the guide shaft supporting member 31 side in such a manner as to face to the guide member 61. At this time, the end portion, where the guide face 29 is formed, of the movable base 24 of the optical pickup 23 is put between the control end 65a and the guide member 61. The guide face 29 of the movable base 24 is thus prevented from being largely floated from the guide member 61.

In the above-described optical disk recording/reproducing apparatus, the guide face 29 is provided on the movable base 24 of the optical pickup 23 on the side opposite to the portion guided by the guide shaft 55. The guide face 29, which extends longer in the movement direction of the movable base 24, is guided while being slidably contacted with the round-bar shaped guide member 61 provided on the base 20. Accordingly, with respect to the base 20 side, only the positional accuracy of the portion slidably contacted with the guide face 29 of the guide member 61 exerts an effect on the feeding accuracy of the optical pickup 23, and the rest of the feeding accuracy of the optical pickup 23 is dependent on the accuracy of the optical pickup 23 side. As a result, it becomes possible to lower the accuracies of parts of the base 20 and hence to reduce the cost of the parts of the base 20.

Other than the above-described features, in this optical disk recording/reproducing apparatus, the skew adjustment mechanism and the RD adjustment mechanism can be simply constructed as described above.

Hereinafter, the skew adjustment and RD adjustment will be described.

When the skew sensor 26 detects a deviation in optical axis between a light beam emitted to the optical disk 4 and a reflection light beam from the optical disk 4 in the radial direction of the optical disk 4, an error signal thus detected is transmitted to a skew motor 41 as an error voltage through a servo-circuit (not shown). The skew motor 41 is rotated on the basis of the detection result, and as described above, the guide shaft supporting member 31 is turned around the rotating shaft 34. The guide shaft 55 supported by the guide shaft supporting member 31 is thus tilted in the radial direction of the optical disk 4. As a result, the optical pickup 23 is tilted, to thus adjust the radial skew.

In the case of adjusting a deviation in optical axis between a light beam emitted to the optical disk 4 and a reflection light beam from the optical disk 4 in the direction perpendicular to the radial direction of the optical disk 4, the skew adjustment screw 63 is fastened into or loosened from the screw hole 64 of the base 20.

With this operation, the free end of the guide member supporting portion 57 of the guide member supporting member 56 is descended or ascended, and thereby the height of the guide member 61 is changed in the vertical direction. Accordingly, the portion, where the guide face 29 is supported opposite to the side supported by the guide shaft 55, of the optical pickup 23 is moved in the vertical direction. The optical pickup 23 is thus tilted in the direction perpendicular to the radial direction of the optical disk 4, and thereby the optical axis of the pickup main body 25 is adjusted in the above direction. As a result, the tangential skew is adjusted.

In addition, a cam gear similar to the cam gear 38 in the radial skew adjustment mechanism may be provided for vertically moving the free end of the guide member supporting portion 57 of the guide member supporting member 56. With this configuration, the tangential skew can be automatically adjusted. The tangential skew can be also adjusted by vertically moving the rotating shaft.

The RD adjustment can be made by changing the position of the guide shaft 55 relative to the spindle motor 21. Accordingly, as described above, when the RD adjustment plate 49 is turned by loosening the screw 53 fixing the RD adjustment plate 49 on the bed 50, the contact position of the receiving face 54a with the guide shaft 55 is changed in the direction where the sub-base 30 and the guide shaft supporting member 31 are arranged. The guide shaft 55 is thus changed in its orientation centered on the contact point with the fulcrum face 48a. As a result, the RD adjustment can be made. In addition, in this embodiment, the RD adjustment is made only by moving one side of the guide shaft 55; however, the guide shaft 55 may be fixed on a different member and the different member may be moved.

While the preferred embodiments of the present invention have been described, such description is for illustrative purposes only, and it is to be understood that changes and variations may be made without departing from the spirit or scope of the following claims.

What is claimed is:

1. A disk reproducing apparatus comprising:

a disk driving unit for rotating a disk;

an optical pickup assembly having a movable base member and a pickup main body supported on the movable base member;

a guide shaft mounted on a stationary base for guiding said movable base member supporting said pickup main body;

guide bearings formed on an edge portion of said movable base member through which said guide shaft is slidably inserted;

a single guide face only discretely formed on a lower surface of another edge portion of the movable base member so as to extend in the direction along which said guide bearings are separated from each other;

said stationary base having a guide member directly and fixedly formed on only one discrete portion thereof on which said guide face slidably contacts, said guide member facing said guide shaft with said pickup main body being positioned between said guide member and said guide shaft, said guide member having a length shorter than a sliding distance of said pickup main body in a guiding direction, wherein said guide member is arranged to only contact said single guide face to thereby obtain an increased feeding accuracy of the pickup main body, and wherein the feeding accuracy of the pickup main body is substantially determined only by accuracies of the movable base member and the guide member;

a pickup driving unit for driving a pickup of said pickup main body in the radial direction of said disk; and a signal processing unit for applying a specified processing to a signal reproduced from said pickup.

2. A disk reproducing apparatus according to claim 1, wherein said guide face is linearly contacted with said guide member in said guiding direction.

3. A disk reproducing apparatus according to claim 1, wherein said guide face is linearly contacted with said guide member in a direction perpendicular to said guiding direction.

4. A disk reproducing apparatus according to claim 3, wherein said guide member comprises a bar member formed into a circular shape in cross-section.

5. A disk reproducing apparatus according to claim 3, wherein said guide member comprises a bar member formed into a trapezoidal shape in cross-section.

6. A disk reproducing apparatus according to claim 1, wherein said guide shaft has a first supporting member for tiltingly supporting at least one end of said guide shaft.

7. A disk reproducing apparatus according to claim 6, further comprising:

a means for detecting a skew amount; and a means for setting the tilting of said guide shaft in accordance with a detection output from said detecting means.

8. A disk reproducing apparatus comprising:

a disk driving unit for rotating a disk;

an optical pickup assembly having a movable base member and a pickup main body supported on the movable base member;

a guide shaft mounted on a stationary base for guiding said movable base member supporting said pickup main body;

guide bearings formed on an edge portion of said movable base member through which said guide shaft is slidably inserted;

a single guide face only discretely formed on a lower surface of another edge portion of the movable base member so as to extend in the direction along which said guide bearings are separated from each other;

said stationary base having a guide member directly and fixedly formed on only one discrete portion thereof with a generally circular cross-section on which said guide face slidably contacts, said guide member facing said guide shaft with said pickup main body being positioned between said guide member and said guide shaft, said guide member having a length shorter than a sliding distance of said pickup main body in a guiding direction, wherein said guide member is arranged to only contact said single guide face in substantially only a line contact to thereby obtain an increased feeding accuracy of the pickup main body, and wherein the feeding accuracy of the pickup main body is substantially determined only by accuracies of the movable base member and the guide member;

a pickup driving unit for driving a pickup of said pickup main body in the radial direction of said disk; and a signal processing unit for applying a specified processing to a signal reproduced from said pickup.

* * * * *